US012627446B2

(12) United States Patent
Ma et al.

(10) Patent No.: US 12,627,446 B2
(45) Date of Patent: May 12, 2026

(54) METHOD PERFORMED BY USER EQUIPMENT, AND USER EQUIPMENT

(71) Applicant: Sharp Kabushiki Kaisha, Sakai City (JP)

(72) Inventors: Xiaojun Ma, Shanghai (CN); Chao Luo, Shanghai (CN); Renmao Liu, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 370 days.

(21) Appl. No.: 18/031,639

(22) PCT Filed: Oct. 13, 2021

(86) PCT No.: PCT/CN2021/123503
§ 371 (c)(1),
(2) Date: Apr. 13, 2023

(87) PCT Pub. No.: WO2022/078377
PCT Pub. Date: Apr. 21, 2022

(65) Prior Publication Data
US 2023/0388082 A1     Nov. 30, 2023

(30) Foreign Application Priority Data

Oct. 16, 2020     (CN) ........................... 202011111646.9

(51) Int. Cl.
*H04L 5/00*          (2006.01)
*H04W 72/232*     (2023.01)

(52) U.S. Cl.
CPC ......... *H04L 5/0053* (2013.01); *H04W 72/232* (2023.01)

(58) Field of Classification Search
CPC ........................... H04W 72/232; H04L 5/0053
See application file for complete search history.

(56) References Cited

U.S. PATENT DOCUMENTS

| | | | |
|---|---|---|---|
| 2018/0192383 A1 | 7/2018 | Nam et al. | |
| 2020/0344792 A1* | 10/2020 | Liu ...................... | H04B 17/382 |
| 2021/0058189 A1* | 2/2021 | Xiao ...................... | H04L 1/0038 |
| 2022/0078728 A1* | 3/2022 | Yi .......................... | H04W 48/16 |
| 2022/0232496 A1* | 7/2022 | Kim ...................... | H04L 5/0053 |

(Continued)

FOREIGN PATENT DOCUMENTS

| | | |
|---|---|---|
| CN | 110168972 A | 8/2019 |

OTHER PUBLICATIONS

Official Communication issued in International Patent Application No. PCT/CN2021/123503, mailed on Jan. 17, 2022.

(Continued)

*Primary Examiner* — Kevin M Cunningham
(74) *Attorney, Agent, or Firm* — Keating & Bennett, LLP

(57) ABSTRACT

Provided in the present invention is a method performed by user equipment (UE), the method including: determining a location of a receiving bandwidth according to a configuration parameter; and receiving a signal within the receiving bandwidth, the configuration parameter including a bandwidth location of a synchronization signal block (SSB) and/or a bandwidth location of a control resource set (CORESET).

6 Claims, 3 Drawing Sheets

(56)  References Cited

U.S. PATENT DOCUMENTS

| 2023/0021700 A1* | 1/2023 | Lin | ........................ H04L 5/0025 |
| 2023/0179374 A1* | 6/2023 | Xu | ........................ H04L 5/0053 |
| | | | 370/329 |

OTHER PUBLICATIONS

"3rd Generation Partnership Project; Technical Specification Group Services and System Aspects; Service requirements for cyber-physical control applications in vertical domains; Stage 1 (Release 17)", 3GPP TS 22.104 V17.3.0, Jul. 2020, pp. 1-76.

"3rd Generation Partnership Project; Technical Specification Group Services and System Aspects; Study on enhancements for cyber-physical control applications in vertical domains; Stage 1 (Release 17)", 3GPP TR 22.832 V17.3.0, Sep. 2020, pp. 1-87.

"3rd Generation Partnership Project; Technical Specification Group Services and System Aspects; Study on Communication for Automation in Vertical Domains (Release 16)", 3GPP TR 22.804 V16.3.0, Jul. 2020, pp. 1-197.

* cited by examiner

S101

Determine a location of a receiving bandwidth according to a location of an SSB and/or a configuration of a CORESET

S102

Receive a signal within the receiving bandwidth

UE50

METHOD PERFORMED BY USER EQUIPMENT, AND USER EQUIPMENT

TECHNICAL FIELD

The present invention relates to the technical field of wireless communications, and in particular to a method performed by user equipment, and corresponding user equipment.

BACKGROUND

In existing 5G/NR networks, three typical service models are defined: an enhanced mobile broadband (eMBB) service, a massive machine-type communication (mMTC) service, and an ultra-reliable and low latency communication (URLLC) service. In addition to these, there is also a time sensitive communication (TSC) service.

An important goal of 5G is to achieve the interconnection industry. 5G interconnection can be a catalyst for a next wave of industrial transformation and digitalization, and can enhance flexibility, productivity, and efficiency, reduce maintenance costs, improve operational security, etc. Devices in such environments include pressure sensors, humidity sensors, thermometer, motion sensors, accelerometers, effectors, and the like. These sensors and effectors need to be connected to 5G wireless access networks and core networks. The literature, including TR 22.804 etc., describe use cases and requirements of a large-scale industrial wireless sensor network (IWSN), which, in addition to including very high requirements on a URLLC service, include requirements on relatively low-end services of relatively small size, and/or a plurality of years of battery life in a wireless state. Requirements on these services are higher than those on a low power wide area network (LPWA), but are lower than those on a URLCC and an eMBB.

Similar to the Internet industry, 5G interconnection can become a catalyst for a next wave of smart city innovation. As an example, TSR 22.804 describes use cases and requirements of smart cities. The smart city vertically covers data collection and processing to more efficiently monitor and control city resources, and to provide services to city residents. In particular, deployment of surveillance cameras is an important component of the smart city, and is also an important component of factories and industry.

Finally, examples of wearable apparatuses include smart watches/rings, eHealth related apparatuses, medical monitoring apparatuses, etc. One feature of such a scenario is that the apparatus needs to be compact.

As a baseline, the requirements on these three use cases are as follows:

General Requirements:

Apparatus complexity: a main motivation for a new apparatus type is reduced costs and complexity of apparatuses in comparison with eMBB and URLLC apparatuses. Especially in the case of industrial sensors.

Apparatus size: most of the use cases require a compact apparatus design.

Deployment scenarios: the system should support all FR1/FR2 bands of FDD and TDD.

Specific Requirements on Use Cases:

Industrial wireless sensors: reference use cases and requirements are described in TR 22.832 and TS 22.104: the communication service availability is 99.99%, and the end-to-end latency is less than 100 milliseconds. The reference bit rate is less than 2 Mbps (possibly asymmetrical, e.g., uplink heavy load), and is smooth for all use cases and apparatuses. The battery should last at least several years. For safety related sensors, latency requirements are lower, 5-10 ms (TR 22.804).

Video surveillance: in TSR 22.804, a reference economic video bit rate is 2-4 Mbps, the latency being less than 500 ms, and the reliability being 99% to 99.9%. High-end video, for example, the agriculture requires 7.5-25 Mbps. The service mode may be primarily UL transmission.

Wearable apparatuses: a reference bit rate of a smart wearable application may be 5-50 Mbps, and may be at least 2-5 Mbps in DL. A peak bit rate of an apparatus is higher, and is, for example, up to 150 Mbps in a downlink and up to 50 Mbps in an uplink. The battery of the apparatus should last 1-2 weeks.

The new requirement scenario has more requirements on network transmission, and especially, a terminal apparatus needs to have the service matching reception capability while meeting constraint conditions such as a smaller size, lower processing complexity, less antennas, a smaller bandwidth, etc. These require that the existing air interface resource configuration method and channel transmission method are improved.

SUMMARY

In order to address at least part of the aforementioned issues, the present invention provides a method performed by user equipment, and user equipment.

A method performed by user equipment according to a first aspect of the present invention comprises: determining a location of a receiving bandwidth according to a configuration parameter; and receiving a signal within the receiving bandwidth, the configuration parameter comprising a bandwidth location of a synchronization signal block (SSB) and/or a bandwidth location of a control resource set (CORESET).

In the method performed by user equipment according to the first aspect of the present invention, the location of the receiving bandwidth is determined according to a bandwidth center of the SSB, or the location of the receiving bandwidth is determined according to relative locations of the SSB and the CORESET.

The method performed by user equipment according to the first aspect of the present invention further comprises: determining the location of the receiving bandwidth according to an SSB subcarrier offset parameter.

In the method performed by user equipment according to the first aspect of the present invention, the location of the receiving bandwidth is determined according to a bandwidth center of the CORESET.

In the method performed by user equipment according to the first aspect of the present invention, when the determined receiving bandwidth and a bandwidth of the CORESET do not overlap, the location of the receiving bandwidth is adjusted so that the location of the receiving bandwidth overlaps with the CORESET.

In the method performed by user equipment according to the first aspect of the present invention, the UE determines resource parameters of a first physical downlink control channel (PDCCH) and a second physical downlink control channel (PDCCH), and the resource parameters of the first PDCCH and the second PDCCH are different, wherein the resource parameter is one or a combination of a control channel element (CCE) sequence number or a candidate PDCCH sequence number or a resource element group (REG) bundle sequence number, and the UE receives the PDCCH within the receiving bandwidth.

In the method performed by user equipment according to the first aspect of the present invention, the first PDCCH and the second PDCCH transmit the same downlink control information (DCI) content.

In the method performed by user equipment according to the first aspect of the present invention, the resource parameter is determined by relative locations of the CORESET0 of the PDCCH and the SSB, and the relative locations comprise offsets of a minimum RB of the CORESET0 and a minimum RB of the SSB or offsets of a bandwidth center of the CORESET and a bandwidth center of the SSB.

In the method performed by user equipment according to the first aspect of the present invention, the resource parameter is determined by a bandwidth and a symbol quantity of the CORESET of the PDCCH and a slot number of the PDCCH.

User equipment according to a second aspect of the present invention comprises: a processor; and a memory storing instructions, wherein the instructions, when run by the processor, perform the method according to the first aspect.

BRIEF DESCRIPTION OF THE DRAWINGS

The above and other features of the present invention will be more apparent from the following detailed description in combination with the accompanying drawings, in which.

DETAILED DESCRIPTION

Figure 1:
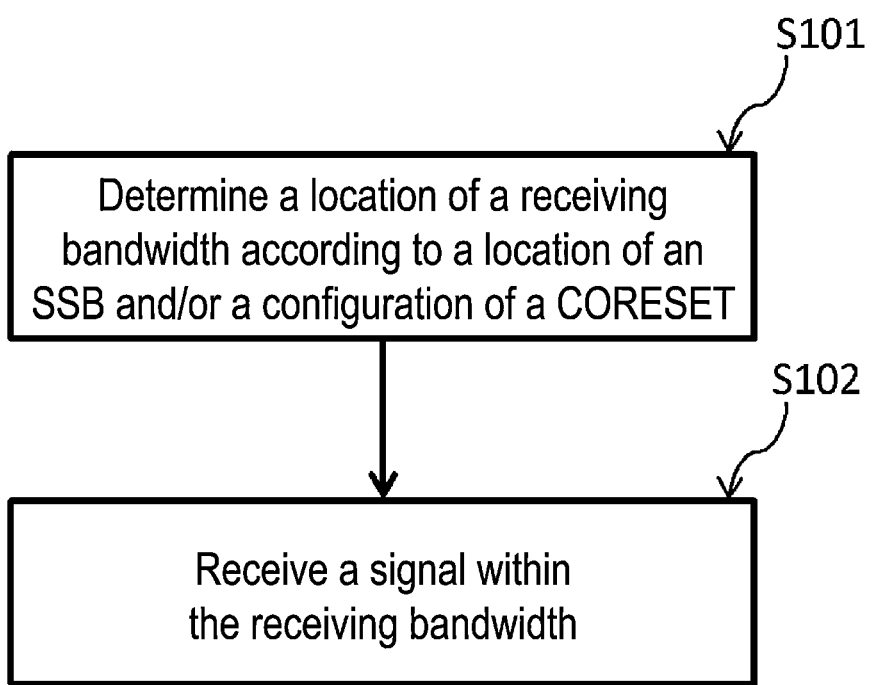
FIG. 1 shows a flowchart of a method performed by user equipment according to Embodiment 1 of the present invention.

The following describes the present invention in detail with reference to the accompanying drawings and specific embodiments. It should be noted that the present invention should not be limited to the specific embodiments described below. These embodiments are merely provided as examples to convey the scope of the subject matter to those skilled in the art. In addition, detailed descriptions of well-known technologies not directly related to the present invention are omitted for the sake of brevity, in order to avoid obscuring the understanding of the present invention.

Typically, all terms used herein will be interpreted according to the ordinary meaning thereof in the related technical field unless different meanings are clearly presented and/or implied in the context where the terms are used. Unless specified otherwise clearly, all references to a/one/the element, apparatus, assembly, component, step, etc., should be publicly interpreted as referring to at least one instance of the element, apparatus, assembly, component, step, etc. The steps of any method disclosed herein do not need to be performed in the exact order disclosed unless one step has to be explicitly described as being after or before another step and/or one step has to be after or before another step as implied. In appropriate cases, any feature of any embodiment disclosed herein is applicable to any other embodiment. Likewise, any advantage of any embodiment is applicable to any other embodiment, and vice versa.

In the following description, a 5G/NR mobile communication system and later evolved versions thereof are used as exemplary application environments to set forth a plurality of embodiments according to the present invention in detail. However, it is to be noted that the present invention is not limited to the following embodiments, but is applicable to many other wireless communication systems, such as a communication system after 5G, a 4G mobile communication system before 5G, and an 802.11 wireless network.

Some terms involved in the present invention are described below. Unless otherwise specified, the terms used in the present invention adopt the definitions herein. The terms given in the present invention may vary in LTE, LTE-Advanced, LTE-Advanced Pro, NR, and subsequent or other communication systems, but unified terms are used in the present invention. When applied to a specific system, the terms may be replaced with terms used in the corresponding system.

3GPP: 3rd Generation Partnership Project

LTE: Long Term Evolution

NR: New Radio

UE: User Equipment eNB: evolved NodeB, evolved base station gNB: NR base station kssb: SSB subcarrier offset TTI: Transmission Time Interval OFDM: Orthogonal Frequency Division Multiplexing CP-OFDM: Cyclic Prefix Orthogonal Frequency Division Multiplexing C-RNTI: Cell Radio Network Temporary Identifier CSI: Channel State Information HARQ: Hybrid Automatic Repeat Request CSI-RS Channel State Information Reference signal CRS: Cell Reference Signal PBCH: Physical Broadcast Channel PUCCH: Physical Uplink Control Channel PUSCH: Physical Uplink Shared Channel PRACH: Physical random-access channel PDSCH: Physical downlink shared channel PDCCH: Physical downlink control channel UL-SCH: Uplink Shared Channel DL-SCH: Downlink Shared Channel RACH: random-access channel DCI: Downlink Control Information CG: Configured Grant MCS: Modulation and Coding Scheme RB: Resource Block RE: Resource Element CRB: Common Resource Block CP: Cyclic Prefix PRB: Physical Resource Block VRB: Virtual Resource Block FDM: Frequency Division Multiplexing TDD: Time Division Duplexing FDD: Frequency Division Duplexing RRC: Radio Resource Control RSRP: Reference Signal Receiving Power SRS: Sounding Reference Signal DMRS: Demodulation Reference Signal CSI-RS Channel State Information Reference Signal CRC: Cyclic Redundancy Check SFL Slot Format Indication SIB: System Information Block SIB1: System Information Block Type 1

PSS: Primary Synchronization Signal

SSS: Secondary Synchronization Signal

SSB: Synchronization Signal Block

CRB: Common Resource Block

BWP: Bandwidth Part

SFN: System Frame Number (radio frame number)

PCI: Physical Cell ID

IE: Information Element

EN-DC: EUTRA-NR Dual Connection

MCG: Master Cell Group

SCG: Secondary Cell Group

PCell: Primary Cell

SCell: Secondary Cell

SPS: Semi-Persistent Scheduling

TA: Timing Advance

PT-RS: Phase-Tracking Reference Signal

TB: Transport Block

TBS: Transport Block Size

CB: Code Block

QPSK: Quadrature Phase Shift Keying

16/64/256 QAM: 16/64/256 Quadrature Amplitude Modulation

AGC: Automatic Gain Control

TDRA (field): Time Domain Resource Assignment indication (field)

FDRA (field): Frequency Domain Resource Assignment indication (field)

ARFCN: Absolute Radio Frequency Channel Number

RedCap Device: Reduced Capability Device

CORESET0: Control Resource Set

CCE: Control Channel Element

REG: Resource Element Group

MIB: Master Information Block

DRX: Discontinuous Reception

AL: Aggregation Level

UCI: Uplink Control Information

CSS: Common Search Space

USS: UE-specific Search Space

SCS: Sub-Carrier Spacing

SLIV: Start and Length Indicator Value

RIV: Resource Indicator Value

SS-RSRP: Synchronization Signal Reference Signal Received Power

SS-RSRQ: Synchronization Signal Reference Signal Received Quality

1. R1: Frequency range 1 as defined in TS 38.104

1. R2: Frequency range 2 as defined in TS 38.104

The following is a description of the prior art associated with the solution of the present invention. Unless otherwise specified, the same terms in the specific embodiments have the same meanings as in the prior art.

It is worth pointing out that the user equipment and the terminal apparatus in the specification of the present invention have the same meaning, and the UE herein may also represent a terminal, which will not be specifically differentiated or defined hereinafter. Similarly, network apparatuses are apparatuses communicating with a terminal, and include, but are not limited to, a base station apparatus, a gNB, an eNB, a wireless AP, etc., and will not be specifically differentiated or defined hereinafter.

The network apparatus may indicate the behavior of the terminal by transmitting DCI information to the terminal. For example, the network apparatus may perform uplink data transmission scheduling by using DCI format 0_0/0_1/ 0_2, etc., may perform downlink data transmission scheduling by using formats such as DCI format 1_0/1_1/1_2, etc., and may also perform other data transmission or control message indication by using DCI format 2_0/2_1/ . . . /2_6 etc., and DCI format 3_0/3_1 etc. Specific types of DCI messages include, but are not limited to, those mentioned above, and extension or modification may be performed without affecting implementation of the method according to the present invention. DCI information is transmitted by using a PDCCH channel. The terminal receives a PDCCH, acquires corresponding DCI by performing decoding, and performs data transmission according to indication of the DCI.

A unit of time-frequency resources in NR is a slot. One slot includes fourteen (in a normal CP scenario) or twelve (in an extended CP scenario) OFDM symbols. Resources within a slot may be further divided into resource blocks and resource elements. The resource block (RB) may be defined in the frequency domain as $$N_{sc}^{RB} = 12$$

consecutive subcarriers. For example, for a 15 kHz subcarrier spacing (SCS), the RB is 180 kHz in the frequency domain. For a 15 kHz×$2^\mu$ subcarrier spacing, the resource element (RE) represents one subcarrier in the frequency domain and one OFDM symbol in the time domain. The value of $\mu$ may be an integer value within the range 0-4 in different configurations. A plurality of REs may form a REG bundle according to a certain configuration and rule, and the REG bundle is then mapped to a CCE, so as to be used for PDCCH transmission.

The resources of the PDCCH may be determined via CORESET0 and a search space parameter. The terminal may determine, according to the CORESET0 and the search space parameter, specific locations of time-frequency resources used by the PDCCH. The network may transmit the PDCCH by using resources of different aggregation levels (ALs). For example, AL=4 is used. That is, four resource elements, such as four CCEs, on a resource block defined by the CORESET0 and the search space are used to transmit the PDCCH. For example, AL=16 is used. That is, sixteen resource elements, such as sixteen CCEs, on a resource block defined by the CORESET0 and the search space are used to transmit the PDCCH. Depending on the size of the search space and the value of the aggregation level, the search space may include a plurality of PDCCH candidate locations. The terminal can determine, according to certain rules by receiving a configuration or a predefined parameter, time-frequency resource locations of a certain candidate PDCCH using a certain AL in the CORESET0 and the search space. For example, the terminal can determine that AL consecutive CCEs starting from a certain CCE sequence number are one PDCCH candidate location. The terminal performs DCI information detection on the candidate PDCCH.

The network apparatus transmits SSB information, including a PSS, an SSS, a PBCH signal, etc., and the SSB information is used by the terminal to perform cell searching and synchronization, accessing, etc. The terminal may detect an SSB on a frequency band according to a predetermined rule and parameter, determine parameters such as a bandwidth of the SSB, a location, a subcarrier spacing, etc., and receive a relevant signal. A plurality of parameters used by the terminal to access the network are indicated in a PBCH, such as the CORESET0 parameter, etc. The terminal may perform further processing according to a network configuration parameter, for example, performing PDCCH and PDSCH reception, etc.

In some scenarios, due to the limit of the terminal bandwidth, the bandwidth used by the CORESET0 configured by the network may exceed a reception capability of the terminal, and the terminal can receive signals only in a part of the bandwidth, resulting in reception performance loss or incapability of correct signal detection. In the present invention, appropriate configuration is performed, so that a terminal can receive a signal in a part of a bandwidth, for example, receiving a plurality of PDCCHs, and acquire corresponding relevant DCI content, so as to enhance the reception capability of the terminal, thereby improving the communication capability of a system.

FIG. 1 shows a schematic block diagram of a method performed by user equipment according to the present invention.

S101, determining a location of a receiving bandwidth according to a location of an SSB and/or a location of a CORESET.

S102, receiving a signal within the receiving bandwidth.

In a specific embodiment, a network apparatus transmits a PBCH signal on a frequency band, and broadcasts parameters such as an access configuration of a current cell. A terminal apparatus determines a location of a receiving bandwidth according to a bandwidth location of a synchronization signal block (SSB) and/or a bandwidth location of a control resource set (CORESET). A terminal receives a signal within the determined receiving bandwidth.

The terminal may determine a location of a channel resource required for accessing a cell according to an access configuration parameter, a predefined parameter, etc., for example, configuration parameters of a CORESET0 and a search space for transmitting a type0-PDCCH, including a bandwidth, time-frequency locations, etc. The terminal may determine the time-frequency resource locations of the type0-PDCCH, perform type0-PDCCH detection, and receive a SIB1 message according to a detection result. The terminal determines the location of the receiving bandwidth according to the configuration of the SSB and/or the CORESET0. The terminal does not receive signals that are not in the determined bandwidth location. For example, when the CORESET0 is configured with a relatively large bandwidth, a part of frequency domain resources of the CORESET0 may exceed the location of the receiving bandwidth determined by the terminal, and the terminal does not receive signals of this part.

Alternatively, the terminal determines the location of the receiving bandwidth according to a bandwidth center of the SSB. The terminal uses the bandwidth center of the SSB as a reference point, and determines ½ bandwidth capabilities on two sides of the reference point as the location of the receiving bandwidth. For example, an SCS used by the SSB is used as a unit, and the SSB in NR occupies a bandwidth of 240 subcarriers, so that the terminal can determine that the 120-th subcarrier is the location of the bandwidth center of the SSB. For example, the terminal supports a bandwidth of 50 MHz, and the terminal uses the bandwidth center of the SSB as a reference point, and determines 25 MHz on each of the two sides as the location of the receiving bandwidth. Alternatively, the receiving bandwidth is in the units of RBs determined by the SCS of the CORESET0. For example, 51 RBs can be determined within a bandwidth of 20 M via the SCS of 30 KHz, and the terminal determines 25.5 RBs on each of the two sides of the reference point as the receiving bandwidth. In another example, 32 RBs can be determined within a bandwidth of 50 M via the SCS of 120 KHz, and the terminal determines 16 RBs on each of the two sides of the reference point as the receiving bandwidth.

Alternatively, the terminal determines an integral multiple of RBs on the two sides of the reference point as the receiving bandwidth. For example, the receiving bandwidth of the terminal supports N RBs for a certain SCS, and the terminal determines f(N/2) and N−f(N/2) RBs respectively on the two sides of the reference point as the receiving bandwidth. f(x) is a certain operation, such as rounding up or down.

Alternatively, the terminal determines the receiving bandwidth according to the bandwidth center of the SSB and an SSB subcarrier offset parameter. The terminal uses the bandwidth center of the SSB as a reference point, and adjusts the reference point according to the SSB subcarrier offset parameter kssb indicated by the PBCH so as to align the same with the location of a subcarrier 0 of a CRB. For example, for an FR1 frequency band, the kssb indicates one of 0-23, and an SCS of 15 kHz is used as the unit. The terminal shifts the location of the reference point determined according to the center frequency of the SSB downwards by kssb units so as to align the reference point with the location of the subcarrier 0 of the CRB, and uses the reference point to determine the location of the receiving bandwidth of the terminal. The terminal determines a frequency range or an RB range of the receiving bandwidth according to the location of the reference point.

Alternatively, the terminal uses the bandwidth center of the CORESET as the reference point to determine the location of the receiving bandwidth. For example, the terminal determines the offset from the minimum RB of the CORESET0 to the minimum RB of the SSB according to a CORESET0 parameter configured by the PBCH, and determines the location of the subcarrier 0 of the minimum RB according to a kssb parameter indicated by the PBCH. The terminal can determine the starting position and the bandwidth of the CORESET0 according to the received configuration of the CORESET0, and determine the center of the CORESET0 as the reference point. The terminal determines the ½ bandwidth capability on each of the two sides of the reference point as the location of the receiving bandwidth. The receiving bandwidth may be in the units of RBs determined by the SCS of the CORESET0. For example, 51 RBs can be determined within a bandwidth of 20 M via the SCS of 30 KHz, and the terminal determines RBs on each of the two sides of the reference point as the receiving bandwidth.

Alternatively, when a receiving bandwidth part determined by the terminal and the bandwidth of the CORESET do not overlap, the terminal may adjust the location of the receiving bandwidth, so that the location of the receiving bandwidth overlaps with the CORESET. For example, the RB0 of the CORESET0 is offset from the RB0 of the SSB by four RBs, and the RB0 of the determined bandwidth location is offset from the RB0 of the SSB by ten RBs, so that the RB0-RB5 of the bandwidth location do not overlap with the CORESET0. The terminal adjusts the location of the receiving bandwidth, and aligns the bandwidth RB0 with the location of the RB0 of the CORESET0.

Alternatively, the terminal determines different locations of the receiving bandwidth in different slots. The terminal determines that a signal is received in a first slot according to a location of a first receiving bandwidth and a signal is received in a second slot according to a location of a second receiving bandwidth. For example, the terminal determines that the first receiving bandwidth from the subcarrier 0 of the minimum RB of the CORESET0 to the reference point is used in the first slot, and the terminal determines that the second receiving bandwidth from the reference point to a subcarrier 11 of the maximum RB of the CORESET0 is used in the second slot.

The above embodiments support scenarios where the CORESET and the SSB use the same or different SCSs. If not otherwise specifically stated, relevant calculation can be performed in the units of the SCS of the CORESET and the defined RB.

Figure 2:
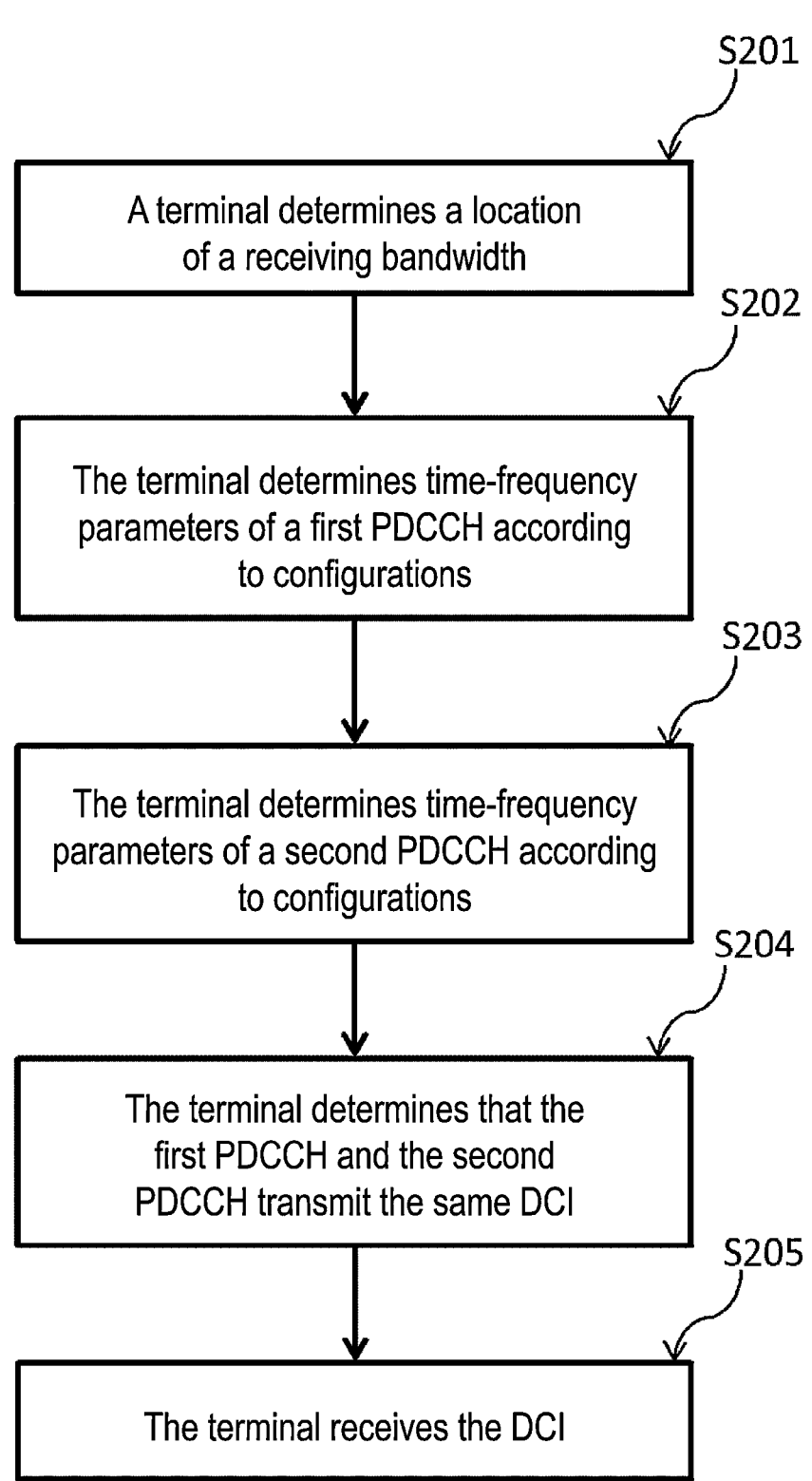
FIG. 2 shows specific steps of a method performed by user equipment according to Embodiment 1 of the present invention.

The terminal performs signal reception after determining the location of the receiving bandwidth. FIG. 2 shows specific steps of a method performed by user equipment according to the present invention.

S201, determining, by a terminal, a location of a receiving bandwidth.

S202, determining, by the terminal, time-frequency parameters of a first PDCCH according to configurations.

S203, determining, by the terminal, time-frequency parameters of a second PDCCH according to configurations.

S204, determining, by the terminal, that the first PDCCH and the second PDCCH transmit the same DCI.

S205, receiving, by the terminal, the DCI.

A network apparatus uses RRC signaling to indicate parameters such as a bandwidth and a symbol quantity of a CORESET of a common search space used by a terminal apparatus to receive a PDCCH, time-frequency locations, etc. The terminal apparatus determines a receiving parameter of the PDCCH according to a configuration parameter.

The terminal determines parameters such as a symbol location of the first PDCCH, a CCE sequence number, etc., according to the configuration parameter, and uses first time-frequency resources to perform PDCCH signal reception. Specifically, the terminal determines, according to the configured parameters, parameters such as the number of a relevant REG bundle, a REG to CCE mapping, CCE sequence numbers corresponding to PDCCHs of different aggregation levels, etc., on a configured symbol and bandwidth. The terminal performs PDCCH signal reception in a location within the receiving bandwidth at the first time-frequency resources according to the determined parameters. The first time-frequency resources are a CCE set corresponding to a PDCCH of an aggregation level determined at the symbol location of the first PDCCH.

The terminal determines parameters such as a symbol location of the second PDCCH, a CCE sequence number, etc., according to the configuration, and uses second time-frequency resources to perform PDCCH signal reception. Specifically, the terminal determines, according to the configured parameters, parameters such as the number of a relevant REG bundle, a REG to CCE mapping, CCE sequence numbers corresponding to PDCCHs of different aggregation levels, etc., on a configured symbol and bandwidth. The terminal performs PDCCH signal reception in a location within the receiving bandwidth at the second time-frequency resources according to the determined parameters. The second time-frequency resources are a CCE set corresponding to a PDCCH of an aggregation level determined at the symbol location of the second PDCCH.

Alternatively, the first PDCCH and the second PDCCH use different receiving bandwidths. The terminal determines that the first PDCCH is received by using a first receiving bandwidth of a first slot, and a second PDCCH is received by using a second receiving bandwidth of a second slot.

Alternatively, the terminal determines slot locations of the first PDCCH and the second PDCCH according to an SSB index, and the first PDCCH is associated with a slot n0 of an SSB index i. The second PDCCH is associated with a slot n0+1 of the SSB index i. Alternatively, the terminal determines slot locations of the first PDCCH and the second PDCCH according to signaling transmitted by a network. For example, the network indicates that the first PDCCH and the second PDCCH are respectively transmitted in different monitoring occasions within one search space period.

The terminal determines a candidate resource location of the PDCCH according to a CORESET location and an SSB location configured by the network. The PDCCH has one or a plurality of candidate locations in the CORESET. The terminal determines a resource index corresponding to each candidate location, such as a REG bundle sequence number, a CCE sequence number, etc. The terminal determines a parameter of a first candidate location according to relative locations of the CORESET and the SSB. Alternatively, the relative locations are relative locations of a minimum RB sequence number of the SSB and a minimum RB sequence number of the CORESET. Alternatively, the relative locations are relative locations of a reference point of the SSB and the minimum RB sequence number of the CORESET. Alternatively, the relative locations are distances of the reference point of the SSB and a reference point of the CORESET, and the reference points can be determined with reference to the foregoing embodiments.

In an embodiment used as an example, the terminal determines the REG bundle to CCE mapping according to the relative location. The terminal determines the number of the REG bundle and time-frequency resources corresponding to each REG bundle, and performs the REG bundle to CCE mapping according to a mapping rule. Alternatively, the terminal may perform a mapping from a CCE sequence number x to a REG bundle sequence number f(x) according to a formula.

$$f(x) = (rC + c + n_{shift}) \mathrm{mod}\left(N_{REG}^{CORESET0} \big/ L\right)$$

$$x = cR + r$$

$$r = 0, 1, \ldots, R-1$$

$$c = 0, 1, \ldots, C-1$$

$$C = N_{REG}^{CORESET0} \big/ (LR)$$

$$n_{shift} = \begin{cases} N_{ID}^{cell} & \text{otherwise} \\ N_{ID}^{cell} + \left\lfloor (K) * \dfrac{N_{symb}^{CORESET}}{L} \right\rfloor & \text{for slot } n0 \end{cases}$$

where $$L = 6, R = 2, N_{symb}^{CORESET}$$

is the number of symbols used by the CORESET, and $$N_{REG}^{CORESET}$$

is the number of REGs used by the CORESET.

$$N_{ID}^{cell}$$

is a cell ID. K is a relative location value of the CORESET and the SSB. n0 is the slot number where the first PDCCH is located.

In an embodiment used as an example, the terminal may determine, according to the relative location, the CCE sequence number used by the PDCCH. For example, the terminal determines, according to a formula, a CCE sequence number used by a PDCCH of an aggregation level L, $$L \cdot \left\{ \left( Y_{p,n_{sf}^{\mu}} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i$$

$$Y_{p,n_{sf}^{\mu}} = \begin{cases} 0 & \text{otherwise} \\ \left\lfloor K * \frac{N_{symb}^{CORESET}}{6} \right\rfloor * 2 & \text{for slot } n0 \end{cases}$$

where L is the aggregation level used by the PDCCH, and $$m_{s,n_{CI}} = 0, \dots, M_{s,0}^{(L)},$$

is the candidate PDCCH sequence number at the aggregation level L.

$$M_{s,max}^{(L)} = M_{s,0}^{(L)}$$

is the UE to determine the number of candidate PDCCHs corresponding to the aggregation level L in a search space s. $n_{CI}$ is a carrier sequence number, and is 0 here. $N_{CCE,p}$ is the number of CCEs used by a CORESET p.

$$N_{symb}^{CORESET}$$

is the number of symbols used by the CORESET. K is the relative location value. n0 is the slot number where the first PDCCH is located. The value of i is 0-L-1.

Alternatively, the terminal determines, according to the bandwidth of the CORESET and an aggregation level parameter to be measured, the CCE sequence number used by the PDCCH. For example, the terminal determines, according to a formula, a CCE sequence number used by a PDCCH, $$L \cdot \left\{ \left( Y_{p,n_{sf}^{\mu}} + \left\lfloor \frac{m'_{s,n_{CI}} \cdot N_{CCE,p}}{L \cdot M_{s,max}^{(L)}} \right\rfloor + n_{CI} \right) \mod \lfloor N_{CCE,p}/L \rfloor \right\} + i$$

where for $Type0\text{-}PDCCH\ CSS$, $m'_{s,n_{CI}} = \begin{cases} m_{s,n_{CI}} & \text{otherwise} \\ M_{s,max}^{(L)} - m_{s,n_{CI}} - 1 & \text{for slot } n0 \end{cases}$ where L is the aggregation level used by the PDCCH, and $$m_{s,n_{CI}} = 0, \dots, M_{s,0}^{(L)}$$

is the candidate PDCCH sequence number at the aggregation level L.

$$M_{s,max}^{(L)} = M_{s,0}^{(L)}$$

is configured by UE to determine the number of candidate PDCCHs corresponding to the aggregation level L in a search space s. $n_{CI}$ is a carrier sequence number, and is 0 here. $N_{CCE,\ p}$ is the number of CCEs used by a CORESET p.

$$N_{symb}^{CORESET}$$

is the number of symbols used by the CORESET. K is a relative location value of the CORESET0 and the SSB. n0 is the slot number where the first PDCCH is located. The value of i is 0-L-1.

The terminal determines that the first PDCCH and the second PDCCH transmit the same DCI content. Optionally, the terminal determines, according to a predefined rule, that the first PDCCH and the second PDCCH transmit the same DCI content. For example, when the network transmits a CORESET configuration greater than a supported minimum bandwidth, the terminal determines that the first PDCCH and the second PDCCH transmit the same DCI content. Alternatively, the terminal determines, according to detection, that the first PDCCH and the second PDCCH transmit the same DCI content. For example, the terminal may perform blind detection on PDCCH candidate locations of the same aggregation level. When it is detected that features of the first PDCCH and the second PDCCH are the same, for example, DMRS sequences are the same, the terminal determines that the first PDCCH and the second PDCCH transmit the same DCI content. Alternatively, the terminal may determine, according to indication information, that the first PDCCH and the second PDCCH transmit the same DCI content. The terminal determines, according to RRC signaling or DCI signaling or MAC-CE signaling or the like transmitted by the network, that the first PDCCH and the second PDCCH transmit the same DCI content.

The terminal receives the first PDCCH and the second PDCCH, acquires DCI transmitted by the PDCCH, and performs PDSCH reception according to a configuration indicated in the DCI.

In another specific embodiment, the network apparatus configures a common search space parameter via RRC signaling such as SIB1, and the terminal determines, according to a configuration parameter, time-frequency resource configurations related to the CORESET and the search space to be subjected to detection. The terminal performs PDCCH detection on a determined resource, and may perform PDSCH/Msg4 reception according to a detection result.

In an embodiment used as an example, the terminal may define, via an RRC configuration parameter, configurations of the first PDCCH and the second PDCCH according to a bandwidth and a symbol quantity of the CORESET indicated in RRC/SIB. For example, the network configures the parameters of the first PDCCH and the second PDCCH via an RRC parameter. For example, the network configures an offset of the REG bundle sequence number used by the first PDCCH and the second PDCCH, and the terminal determines, according to the configuration, a REG bundle sequence number corresponding to the CCE used by the first PDCCH and the second PDCCH, and determines time-frequency resources used by the first PDCCH and the second PDCCH. Alternatively, the network configures an offset or a relative relationship of the CCE used by the first PDCCH and the second PDCCH, and the terminal determines, according to a configuration value, time-frequency resources used by the first PDCCH and the second PDCCH.

[Variant Embodiment]

Figure 3:
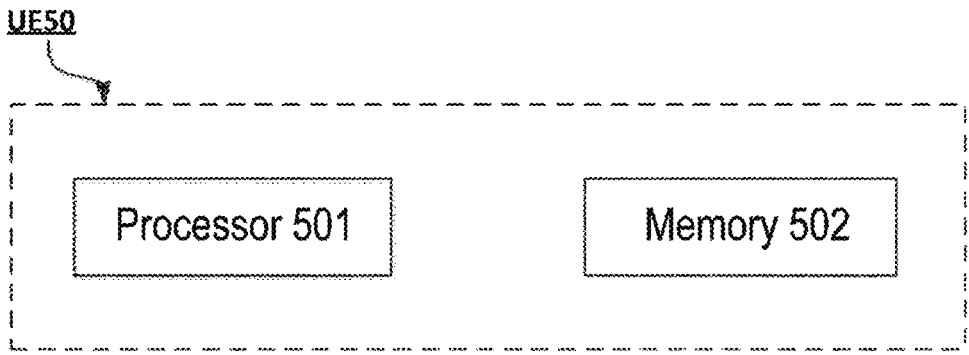
FIG. 3 shows a block diagram of user equipment (UE) according to the present invention.

Hereinafter, FIG. 3 is used to illustrate user equipment that can perform the method performed by user equipment described in detail above in the present invention as a variant embodiment.

FIG. 3 shows a block diagram of user equipment (UE) according to the present invention.

As shown in FIG. 3, user equipment (UE) 50 includes a processor 501 and a memory 502. The processor 501 may include, for example, a microprocessor, a microcontroller, an embedded processor, and the like. The memory 502 may include, for example, a volatile memory (such as a random access memory (RAM)), a hard disk drive (HDD), a non-volatile memory (such as a flash memory), or other memories. The memory 502 stores program instructions. The instructions, when run by the processor 501, can perform the above method performed by user equipment as described in detail in the present invention.

The methods and related equipment according to the present invention have been described above in combination with preferred embodiments. It should be understood by those skilled in the art that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant for limiting the present invention. The present invention is not limited to specific information elements serving as examples of these identifiers. A person skilled in the art could make various alterations and modifications according to the teachings of the illustrated embodiments.

It should be understood that the above-described embodiments of the present invention may be implemented by software, hardware, or a combination of software and hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" may refer to a mobile communication data and control exchange center with large transmission power and a wide coverage area, including functions such as resource allocation and scheduling, data reception and transmission. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A method performed by user equipment (UE), comprising:

determining a location of a receiving bandwidth according to a configuration parameter; and receiving a signal within the receiving bandwidth, wherein the configuration parameter includes a bandwidth location of a synchronization signal block (SSB) and/or a bandwidth location of a control resource set (CORESET), the location of the receiving bandwidth is determined by a reference point which is a bandwidth center of the SSB or CORESET0, and ½ bandwidth capabilities of the UE are determined on two sides of the reference point, the UE receives a first physical downlink control channel (PDCCH) and a second physical downlink control channel (PDCCH) within the receiving bandwidth and determines resource parameters of the first PDCCH and the second PDCCH, and the first PDCCH and the second PDCCH transmit the same downlink control information (DCI), wherein the first PDCCH is associated with a slot of n0 of one SSB with index i, the second PDCCH is associated with the slot of n0+1 of the SSB with the index i, the resource parameter of the first PDCCH and the second PDCCH is one or a combination of a control channel element (CCE) sequence number or a candidate PDCCH sequence number or a resource element group (REG) bundle sequence number, and the first PDCCH or the second PDCCH resource parameters of mapping from a CCE sequence number index x to a REG bundle sequence number f(x) according to a formula:

$$f(x) = (rC + c + n_{shift}) \bmod \left( N_{REG}^{CORESET0} / L \right)$$

$$x = cR + r$$

$$r = 0, 1, \ldots, R - 1$$

$$c = 0, 1, \ldots, C - 1$$

$$C = N_{REG}^{CORESET0} / (LR)$$

$$n_{shift} = \begin{cases} N_{ID}^{cell} & \text{otherwise} \\ N_{ID}^{cell} + \left\lfloor (K) * \dfrac{N_{symb}^{CORESET}}{L} \right\rfloor & \text{for slot } n0 \end{cases}$$

where $$L = 6, R = 2, N_{symb}^{CORESET}$$

is the number of symbols used by the CORESET:

$$N_{REG}^{CORESET}$$

is the number of REGs used by the CORESET;

$$N_{ID}^{cell}$$

is a cell ID;

K is a relative location value of the CORESET and the SSB;

n0 is the slot number where the first PDCCH is located; and otherwise where the second PDCCH is located.

2. The method performed by user equipment according to claim 1, wherein the location of the receiving bandwidth is determined according to relative locations of the SSB and the CORESET to overlap the location of the receiving bandwidth with the CORESET.

3. The method performed by user equipment according to claim 1, further comprising:

determining the reference point of the receiving bandwidth according to an SSB subcarrier offset parameter to align the reference point with the location of subcarrier 0 of a common resource block (CRB) of the SSB.

4. User equipment, comprising:

a processor; and a memory storing instructions, wherein the instructions, when run by the processor, perform the method according to claim 1.

5. A method performed by user equipment (UE), comprising:

determining a location of a receiving bandwidth according to a configuration parameter; and receiving a signal within the receiving bandwidth, wherein the configuration parameter includes a bandwidth location of a synchronization signal block (SSB) and/or a bandwidth location of a control resource set (CORESET), and the location of the receiving bandwidth is determined by a reference point which is a bandwidth center of the SSB or CORESET0, and ½ bandwidth capabilities of the UE are determined on two sides of the reference point;

the UE receives a first physical downlink control channel (PDCCH) and a second physical downlink control channel (PDCCH) within the receiving bandwidth and determines resource parameters of the first PDCCH and the second PDCCH, and the first PDCCH and the second PDCCH transmit the same downlink control information (DCI), wherein the first PDCCH is associated with a slot of no of one SSB with index i, the second PDCCH is associated with the slot of n0+1 of the SSB with the index i, the resource parameter of the first PDCCH and the second PDCCH is one or a combination of a control channel element (CCE) sequence number or a candidate PDCCH sequence number or a resource element group (REG) bundle sequence number, and the resource parameter of CCE sequence number of the first PDCCH according to a formula:

$$L \cdot \left\{ \left( Y_{p,n_{sf}^\mu} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p} / L \rfloor \right\} + i$$

$$Y_{p,n_{sf}^\mu} = \begin{cases} 0 & \text{otherwise} \\ \left\lfloor K * \dfrac{N_{symb}^{CORESET}}{6} \right\rfloor * 2 & \text{for slot } n0 \end{cases}$$

where L is the aggregation level used by the first PDCCH;

$$m_{s,n_{CI}} = 0, \ldots,$$

$$M_{s,0}^{(L)},$$

is the candidate PDCCH sequence number at the aggregation level L;

$$M_{s,max}^{(L)} = M_{s,0}^{(L)}$$

is configured by UE to determine the number of candidate PDCCHs corresponding to the aggregation level L in a search space s;

$n_{CI}$ is a carrier sequence number, and is 0;

$N_{CCE,p}$ is the number of CCEs used by a CORESET p;

the resource parameter of CCE sequence number of the
first PDCCH according to a formula:

$$N_{symb}^{CORESET}$$

is the number of symbols used by the CORESET;

K is the relative location value;

n0 is the slot number where the first PDCCH is located;
and a value of i is 0–L–1.

6. A method performed by user equipment (UE) comprising:

determining a location of a receiving bandwidth according to a configuration parameter; and receiving a signal within the receiving bandwidth,
wherein the configuration parameter includes a bandwidth location
of a synchronization signal block (SSB) and/or a bandwidth location of a control resource set (CORESET),
and the location of the receiving bandwidth is determined by
a reference point which is a bandwidth center of the
SSB or CORESET0, and ½ bandwidth capabilities of
the UE are determined on two sides of the reference
point;

the UE receives a first physical downlink control channel
(PDCCH) and a second physical downlink control
channel (PDCCH) within the receiving bandwidth and
determines resource parameters of the first PDCCH and
the second PDCCH, and the first PDCCH and the
second PDCCH transmit the same downlink control
information (DCI), wherein the first PDCCH is associated with a slot of n0 of one SSB
with index i, the second PDCCH is associated with the
slot of n+1 of the SSB with the index i, the resource parameter of the first PDCCH and the second
PDCCH is one or a combination of a control channel
element (CCE) sequence number or a candidate
PDCCH sequence number or a resource element group
(REG) bundle sequence number, and $$L \cdot \left\{ \left( Y_{p,n_{sf}^\mu} + \left\lfloor \frac{m'_{s,n_{CI}} \cdot N_{CCE,p}}{L \cdot M_{s,max}^{(L)}} \right\rfloor + n_{CI} \right) \bmod \lfloor N_{CCE,p} / L \rfloor \right\} + i \text{ where}$$

$$\text{for Type0} - PDCCH \ CSS, \ m'_{s,n_{CI}} = \begin{cases} m_{s,n_{CI}} & \text{otherwise} \\ M_{s,max}^{(L)} - m_{s,n_{CI}} - 1 & \text{for slot } n0 \end{cases}$$

where L is the aggregation level used by the first PDCCH;
$m_{s,n_{CI}}$=0, . . . , $$M_{s,0}^{(L)}$$

is the candidate PDCCH sequence number at the aggregation level L;

$$M_{s,max}^{(L)} = M_{s,0}^{(L)}$$

is configured by UE to determine the number of candidate PDCCHs corresponding to the aggregation level
L in a search space s;

$n_{CI}$ is a carrier sequence number, and is 0;

$N_{CCE,p}$ is the number of CCEs used by a CORESET p;

$$N_{symb}^{CORESET}$$

is the number of symbols used by the CORESET;

K is a relative location value of the CORESET0 and the
SSB;

n0 is the slot number where the first PDCCH is located;
and a value of i is from 0 to L–1.

* * * * *